Patented Feb. 10, 1931

1,792,170

UNITED STATES PATENT OFFICE

GEORG KRÄNZLEIN, ARTHUR WOLFRAM, AND EMIL HAUSDÖRFER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING ISATIN AND DERIVATIVES THEREOF

No Drawing. Application filed March 22, 1929, Serial No. 349,266, and in Germany March 29, 1928.

The present invention relates to a process of preparing isatin and derivatives thereof.

We have found that cyanoformarylides of the following general formula:

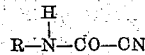

wherein H stands for a substituted or unsubstituted aromatic residue having at least one free ortho-position to the imino group, may be transformed into isatins by ring-closure with a condensing metal chloride as for instance aluminium chloride, zinc chloride or the like. The reaction may be illustrated by the following equation:

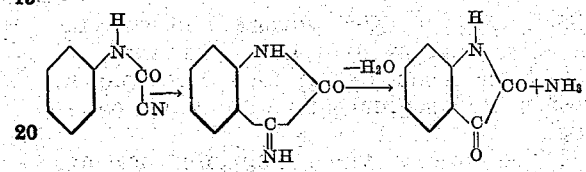

The reaction is preferably carried out in the presence of a diluent or a melting agent as for instance nitrobenzene, trichlorbenzene or sodium chloride while heating to a temperature of between 60° C. and 140° C. The isatins are obtained almost in all cases with an excellent yield.

The following examples serve to illustrate our invention but they are not intended to limit it thereto, the parts being by weight.

(1) 120 parts of aluminium chloride and 30 parts of sodium chloride are melted. At a temperature of from 100° C. to 110° C. 30 parts of cyanoformanilide of the following formula:

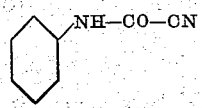

and having its melting point at 120° C. (comp. "Berichte der deutschen Chemischen Gesellschaft" vol. 38, page 2977) are introduced while stirring into the melted mass whereby the temperature rises. The formation of isatin sets in at once and is complete after a few minutes. The melt is poured on ice and water to which diluted hydrochloric acid has been added, heated for a short time and then again allowed to cool. The isatin which has separated in the form of orange-red flakes is filtered by suction, washed with a small quantity of water and dried.

(2) 120 parts of aluminium chloride and 30 parts of cyanoformanilide are introduced into 150 parts of trichlorbenzene. The mixture is heated while stirring. At a temperature of from 50° C. to 60° C. the coloration of the melt turns dark-brown. The reaction does not proceed so quickly as in Example 1. The temperature raised to 70° C.–80° C. while stirring is continued for 1 to 2 hours. The melt is decomposed with ice and water and the trichlorbenzene is expelled by means of water vapor. The solution is filtered; on cooling it the isatin crystallizes out from the solution.

(3) 80 parts of aluminium chloride and 20 parts of sodium chloride are fused together and then 19 parts of cyanoform-(2-methyl-3-chlor)-anilide of the following formula:

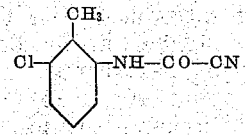

(melting at from 106° C. to 108° C. while frothing) are gradually introduced at from 100° C. to 105° C. while stirring. During the operation the temperature rises up to 120° C. After about 5 minutes the formation of isatin is complete. The melt is given on ice, the acidified liquor is heated for a short time, the isatin which has separated in the form of orange flakes is filtered off by suction, washed with water and dried. Practically pure 6-chlor-7-methylisatin is obtained. After recrystallization from glacial acetic acid, the isatin melts at from 245° C. to 246° C.

(4) 21.5 parts of cyanoform-(3.5-dichloranilide) of the following formula:

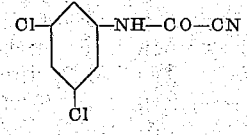

melting at 133° C. and introduced little by little at from 100° C. to 105° C. into the melt of 80 parts of aluminium chloride and 20 parts of sodium chloride, while stirring. The temperature rises up to 120° C. After about 10 minutes the formation of isatin is complete. The melt is worked up according to Example 3. The 4.6-dichlorisatin is obtained with an excellent yield. After recrystallization from glacial acetic acid it melts at 252° C.

(5) 19.6 parts of N-cyanoform-(β-naphthylamine of the following formula:

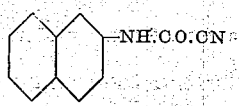

melting at from 143° C. to 145° C. are gradually introduced at about from 100° C. to 105° C. into the melt of 80 parts of aluminium chloride and 20 parts of sodium chloride, while stirring. The temperature is allowed to rise to 110° C. After a few minutes the formation of isatin is complete. The melt is worked up according to Example 3. The 2.1-naphthisatin is obtained in the form of a dark-red product. It is purified by way of the bisulfite compound and then forms small red needles of the melting point 248° C.

(6) 80 parts of aluminium chloride and 20 parts of sodium chloride are fused together and then 20 parts of cyanoform-(3.5-dimethyl)-anilide of the following formula:

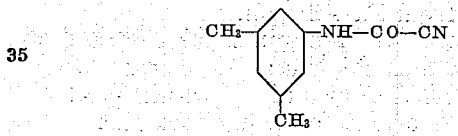

are gradually introduced into the melt at from 120° C. to 125° C. in the course of half an hour; stirring is continued at this temperature for about 10 to 15 minutes and the melt is then poured on ice. Thus 4.6-dimethyl-isatin is obtained with a good yield.

(7) 20 parts of N-cyanoform-(1-chloro-2-naphthylamine) of the following formula:

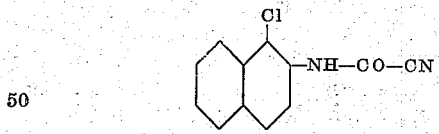

are introduced at from 125° C. to 130° C. in the course of about 20 minutes into a melt of 80 parts of aluminium chloride and 20 parts of sodium chloride, while stirring. Stirring is continued for about 10 to 15 minutes and the melt is poured on ice. After recrystallization the 1-chloro-2.3-naphthisatin thus obtained melts at 262° C.

We claim:

1. The process which comprises heating a compound of the following formula: R—NH—CO—CN wherein R stands for a substituted or unsubstituted aromatic residue having at least one unsubstituted position ortho to the imino group, with a condensing metal chloride.

2. The process which comprises heating a compound of the following formula: R—NH—CO—CN wherein R stands for a substituted or unsubstituted aromatic residue having at least one unsubstituted position ortho to the imino group, with a condensing metal chloride in the presence of a diluent.

3. The process which comprises heating at a temperature of between 60° C. and 140° C. a compound of the following formula:

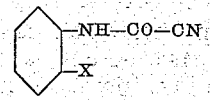

wherein X stands for hydrogen and wherein the other nuclear hydrogen atoms may be substituted or not by any univalent residue, with a condensing metal chloride.

4. The process which comprises heating at a temperature of between 60° C. and 140° C. a compound of the following formula:

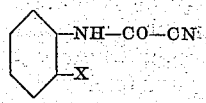

wherein X stands for hydrogen and wherein the other nuclear hydrogen atoms may be substituted or not by any univalent residue, with melted sodium and aluminium chlorides.

5. The process which comprises heating at a temperature of between 60° C. and 140° C. a compound of the following formula:

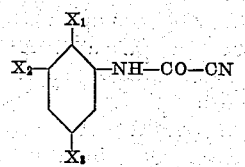

wherein $X_1$ stands for hydrogen or alkyl, $X_2$ and $X_3$ for hydrogen, halogen or alkyl, with a condensing metal chloride.

6. The process which comprises heating at a temperature of between 60° C. and 140° C. a compound of the following formula:

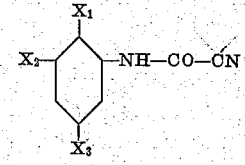

wherein $X_1$ stands for hydrogen or alkyl, $X_2$ and $X_3$ for hydrogen, halogen or alkyl, with melted sodium and aluminium chlorides.

7. The process which comprises heating at a temperature of between 60° C. and

140° C. cyanoformanilide with a condensing metal chloride.

8. The process which comprises heating at a temperature of between 100° C. and 110° C. cyanoformanilide with melted sodium and aluminium chlorides.

9. The process which comprises heating a compound of the following formula: R—NH—CO—CN wherein R stands for a substituted or unsubstituted aromatic residue having at least one unsubstituted position ortho to the imino group, with melted alkali metal- and aluminium chlorides.

10. The process which comprises heating a compound of the following formula: R—NH—CO—CN wherein R stands for a substituted or unsubstituted aromatic residue having at least one unsubstituted position ortho to the imino group, with melted alkali metal- and aluminium chlorides in the presence of a diluent.

In testimony whereof, we affix our signatures.

GEORG KRÄNZLEIN.
ARTHUR WOLFRAM.
EMIL HAUSDÖRFER.